4,392,844 S?
4,392,844 02 RE 32,331

United States Patent [19]

Fulk et al.

[11] E Patent Number: Re. 32,331

[45] Reissued Date of Patent: Jan. 13, 1987

[54] METHOD AND APPARATUS FOR CORRECTING STACK LEAN IN A ZIG-ZAG FOLDED WEB

[75] Inventors: James B. Fulk, Saratoga, Calif.; Jerry L. McKeefry, Pulaski, Wis.; George F. Schuning, DePere, Wis.; John J. Bradley, Green Bay, Wis.

[73] Assignee: Paper Converting Machine Company, Green Bay, Wis.

[21] Appl. No.: 656,722

[22] Filed: Oct. 1, 1984

Related U.S. Patent Documents

Reissue of:

[64] Patent No.: 4,392,844
Issued: Jul. 12, 1983
Appl. No.: 275,796
Filed: Jun. 22, 1981

[51] Int. Cl.[4] ..... B31B 1/26; B31B 7/00; B26D 7/06

[52] U.S. Cl. ..... 493/399; 83/18; 83/30; 83/38; 83/175; 83/422; 270/39; 493/410; 493/433

[58] Field of Search ..... 493/410, 430, 399, 433; 83/863, 865, 879, 880, 884; 270/39

[56] References Cited

U.S. PATENT DOCUMENTS

| | | | |
|---|---|---|---|
| Re. 27,139 | 6/1971 | Sarka | 83/38 |
| 1,858,443 | 5/1932 | Fulk . | |
| 2,981,134 | 4/1961 | Johnson | 83/18 |
| 3,406,959 | 10/1968 | Ross | 493/399 X |
| 4,204,669 | 5/1980 | Nystrand | 493/430 |

FOREIGN PATENT DOCUMENTS

| | | |
|---|---|---|
| 1486857 | 10/1969 | Fed. Rep. of Germany . |
| 1163453 | 9/1969 | United Kingdom . |

*Primary Examiner*—A. J. Heinz
*Attorney, Agent, or Firm*—Tilton, Fallon, Lungmus & Chestnut

[57] ABSTRACT

Method and apparatus for correcting stack lean in a zig-zag folded web wherein a transverse force is cyclically applied to a traveling web so as to vary the motion of the web slightly as it passes through a transverse perforator.

15 Claims, 10 Drawing Figures

METHOD AND APPARATUS FOR CORRECTING STACK LEAN IN A ZIG-ZAG FOLDED WEB

Matter enclosed in heavy brackets [ ] appears in the original patent but forms no part of this reissue specification; matter printed in italics indicates the additions made by reissue.

This invention relates to a method and apparatus for correcting stack lean in a zig-zag folded web and, more particularly, to a web processed for use as a business form.

Contemporary business forms are usually characterized by margins equipped with line holes or other means for subsequent processing through a computer printer by the end user. The form manufacturing step can include lightly printed transverse lines (zones) which facilitate reading of subsequent computer printed data. The forms are manufactured in large quantities at high speed, are zig-zag folded along lines of cross perforation and are packaged in stacks before being sent to the end user.

A recurring defect in the manufacture of folded continuous forms is known as stack lean. By this is meant the departure of a stack of continuous forms (for example, 3,000) from true rectangularity. This lean is either a sidewards lean or the one that is more difficult to correct, the forward/rearward lean. Forward/rearward stack lean is caused by a minute difference in the length of alternate panels, and this invention is directed to a controllable method for correcting said length differences to thereby control the forward or rearward stack lean. Beneficially this method can be applied selectively and independently to each web while processing multiple plies, thereby overcoming limitations of prior art corrective means as applied to multi-web, i.e., multiple plies or multiple width machines, as discussed in more detail hereinafter.

Lean is considered unacceptable by forms manufacturers because of difficulties in packaging and subsequent use. Some forms manufacturers specify not more than one inch lean in a 12 inch high stack (3,000 forms). Even as little a variation as 0.0004" in the perforation spacing in 8½" long forms can cause stack lean to exceed this specification. Thus, one form 8.5004" with the next being 8.4996", and subsequent forms which alternately vary by the same degree, will result in an unacceptable stack. Such a miniscule difference in the length of alternate forms could be far less than the machine direction width of the perf cut, and in order of magnitude, less than the thickness of a human hair. As they apply to business forms machinery in general, that is single web, multiple web or multi-width, two approaches have been followed without success in attempting to correct this type of stack lean.

The first is to force a change in the fold line from its normal position about the center of the line of perforation. The other is to change the position of the perforation itself.

Exemplary of the first approach is co-owned U.S. Pat. No. 4,204,669 which attempted to "square" the stack by departing from the normal or "natural" fold line. By natural fold line, we refer to that location in the web direction generally midway of the thickness of the perforation where the tiny bonds between perforations tend to fold under the impact of the folding tucker. This was achieved through the use of helical gears on the folding rolls so that the timing between one set of fold lines was different from that of the adjacent set of fold lines.

The second unacceptable expedient made use of the same principle of changing the timing but applied this to the perforator. When applying this method, the perforating rolls normally have a circumference equal to two times the form length, with each roll having a perforating blade and an anvil. The change in perforation spacing was achieved by indexing one perforator roll relative to the other to change the distance between adjacent perforations. With 1-wide single web processing this timing change can be effective, but involves small acceleration and deceleration forces that are difficult to control because of the high rotational inertia of the perforator. This expedient, however, is unacceptable in multiple width or multiple ply processing because the corrective adjustment affects all stacking lanes equally. In effect, this expedient exerts control and influence on one lane but may exert unwanted correction to other stacking lanes thus adversely affecting what can normally be good stacks in said other lanes.

With the emphasis on high speed, high volume production, it is necessary to process a web of more than one form width in the production machinery. For higher productivity, contemporary manufacturing practice usually involves multiple width webs—usually three or four—while in other cases the manufacturers have superposed two or more webs and processed them simultaneously. The webs are then separated for folding into discrete stacks as seen in co-owned U.S. Pat. No. 3,596,899. With multiple superposed ply operation, the changing of the timing of the perforator could correct stack lean in one ply but not in the others. The same deficiency was true of the multiple width operation—it being appreciated that to be competitive in production, the producing machine had to process more than a single width web.

We have found that the difference in perforation spacing derives from a number of factors. For example, the type of paper itself including the character of the paper surface and variations in caliper across the web can result in small, localized aberrations which throw off the line of perforation. Web tension variations, manufacturing tolerances for machine gearing and folding rolls, runout of rolls, the stickiness of the ink, the engaging and disengaging of the line holes, the sharpness and flexure of the perforation blades, etc., all may contribute minor but in the aggregate, significant deviations which develop into stack lean.

In view of the prior unsuccessful expedients, the logical approach might seem to have been to quantify the various defect producing factors and thus cure the problem at the source. However, we have discovered a simple, reliable method and apparatus for achieving this without attempting to correct for each of the many factors involved. Rather, the invention involves a means to compensate for the sum of cumulative errors.

The invention solves the problem of forward/rearward stack lean either in side-by-side or superposed webs processing by cyclically changing the motion of each web going through the perforator, and thereby cause minute length changes to occur.

In one specific embodiment of the invention, an advancing web is transversely constrained on both sides (upstream and downstream) of the perforator and then cyclically applying a force in the web direction between one constraint and the perforator to induce a force in the longitudinal web direction and thus change the motion of the web through the perforator.

According to the illustrated embodiment, a transverse force is applied in cyclic fashion having an amplitude variation greater than the amplitude of the summation of the cyclic aberrations. By adjusting the timing of the cyclic transverse force relative to the rotation of the perforator, the cyclic aberrations are compensated for, i.e., cancelled. Thus, instead of attempting to approximate very small aberrations and oppose them instantaneously, we introduce what could be considered a much larger aberration and then time shift it to compensate for the accumulated miniscule aberrations.

In the illustrated embodiment, this is achieved by an eccentric roll downstream of the perforator but between two set of constraining pull rolls which in effect cyclically compensate for the above diverting factors by lengthening and shortening the path of the web between the upstream constraint (such as the nip or constant tension roll before the perforator) and the downstream constraining means. This advantageous lengthening/shortening effect occurs in cyclic fashion over the period of time required for two form lengths to pass the perforator, i.e., three successive fold lines.

In the preferred embodiment, an eccentrically mounted or eccentrically driven roll is arranged such that the maximum amount of eccentricity can be phased to affect the shorter of two consecutive form lengths. For the maximum effect of incremental length increase to the short panel, the eccentric roll is phased so that the maximum (plus) eccentricity is applied as the shorter of two forms passes through the cross perforator.

With this phased relationship, the maximum (minus) eccentricity applies to the longest panel, and the summary effect is to apply maximum plus length change to the shortest panel and the maximum minus length change to the longest panel. The amount of this total plus and minus change may be too great and, by means of the phase shifting device, a preselected sharing or shifting of the plus (or additive) velocity change can be applied to the short panel and a partial share of the subtractive velocity change is made to apply to the same panel. Phase shifting in effect is a means used to vary the magnitude of plus velocity change as it applies to the short panel and the magnitude of the subtractive velocity change as it applies to the longer (adjacent) panel.

It will be understood that in the preferred embodiment, phasing is benefically used as a finely controllable means to vary the magnitude of additive or subtractive velocity change as it applies to a given form length, however, it is within the scope of this invention to use other means to vary the magnitude of velocity change per panel, including, but not limited to variable web displacement means, variable web tension means, etc.

In still other embodiments, the velocity (and web length) changing means can be arranged to act over a cycle greater than two form lengths—normally in even multiples. For example, another phenomenon, that is, a sine wave on both leading and trailing stack edges (referred to as "sawtooth") manifests itself in current production in a variation occurring over 66 form lengths so that the term "cyclic" comprehends variations in motion over different frequencies depending upon the correction to be sought and this can be achieved in compound or tandem as well as single force applying means.

The invention is described in conjunction with the accompanying drawings, in which.

DETAILED DESCRIPTION

Figures 1, 2, 3, 4:
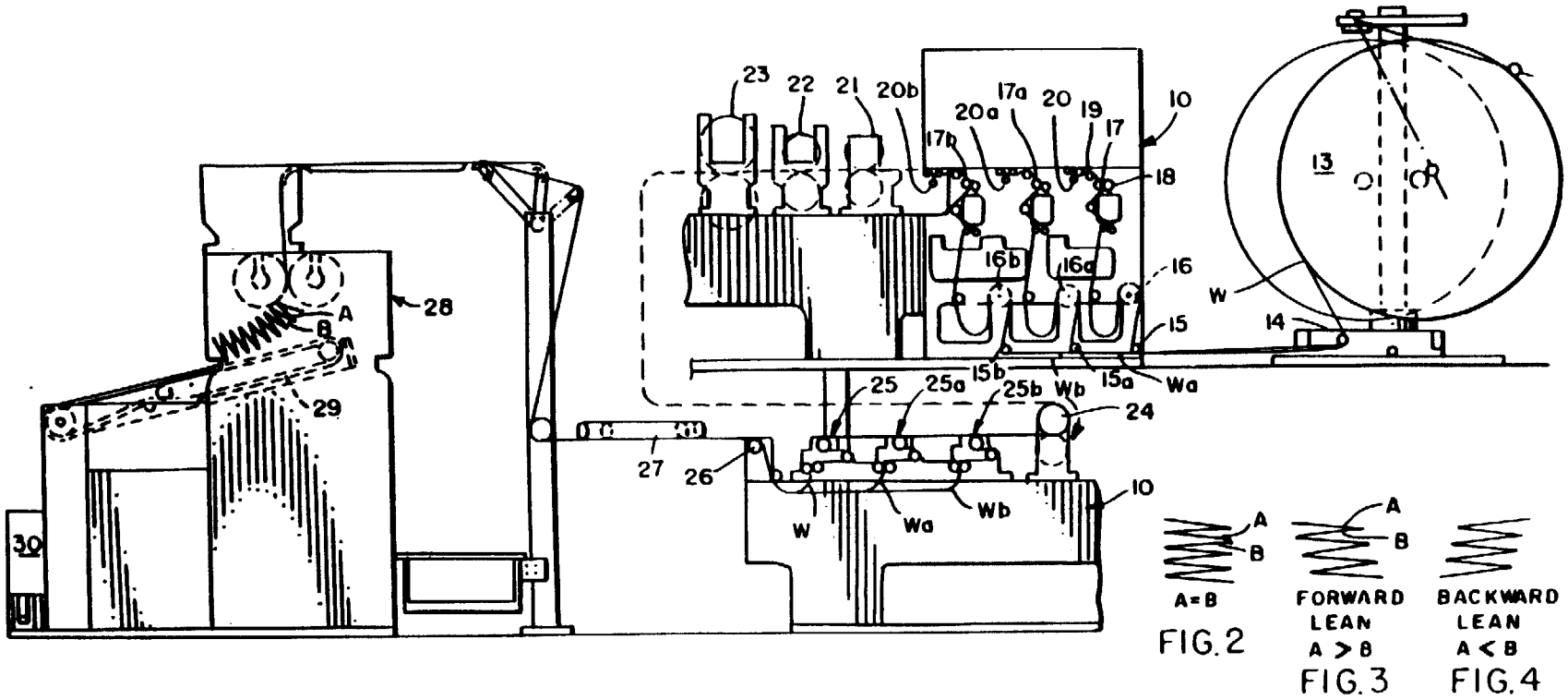
FIG. 1 is a side elevational view, partially schematic, of apparatus for practicing the invention.
FIGS. 2–4 are schematic presentations of a zig-zag folded stack.

In the illustration given and with reference first to FIG. 1, the numeral 10 designates generally the frame of the inventive apparatus. It will be noted that FIG. 1 is a disjointed view in order to show the elongated machine without undue reduction in scale. In other words, the frame 10 continues from the left hand end of the upper portion to the right hand end of the lower portion.

Figures 5, 6:
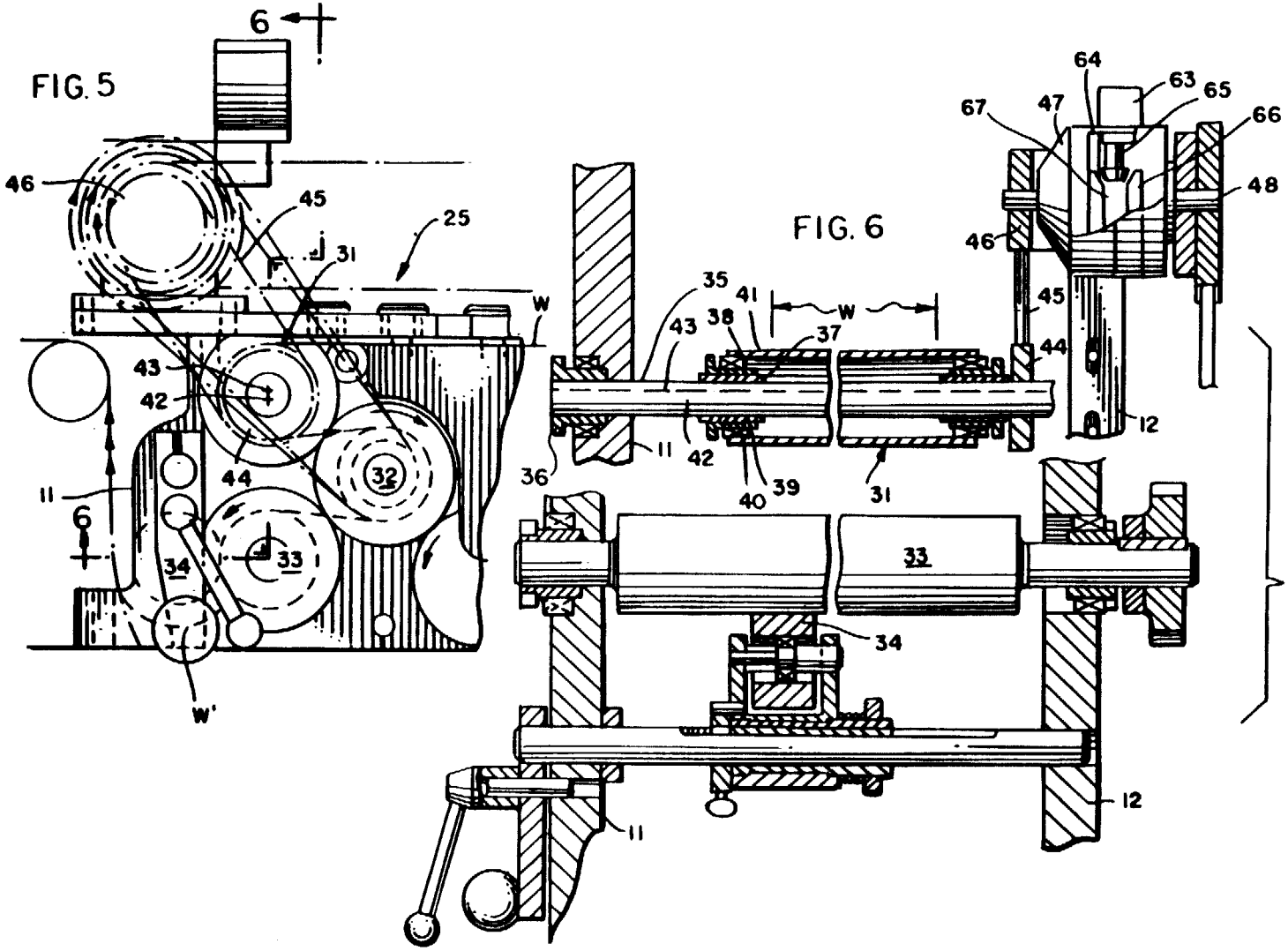
FIG. 5 is an enlarged fragmentary side elevational view of one of the means for cyclically changing web velocity.
FIG. 6 is a fragmentary sectional view taken along the segmental sight line 6—6 of FIG. 5.

In accordance with usual practice, the frame includes two side frames which can be appreciated from the sectional view in FIG. 6 as at 11 and 12. The side frames provide mounting for the various gears, bearings, etc. employed to support and drive the various rolls to be described hereinafter.

Referring again to FIG. 1, the numeral 13 designates a parent roll, the web W of which is passed around a first idler roll 14 and thereafter a second idler roll 15. The invention, in the preferred embodiment, contemplates a plurality of webs being processed simultaneously and for that purpose a plurality of parent rolls (not shown) are provided—suitably mounted on unwind stands in conventional fashion. For example a second web $W_a$ passes around an idler 15a and a third web $W_b$ passes around an idler 15b—still referring to the upper right hand portion of FIG. 1. Each web is drawn from its respective parent roll by a driven pull roll as at 16, 16a, and 16b.

In the illustration given, printing is not performed on the webs so they are directed to further pull rolls 17, 17a and 17b. If desired, these further pull rolls can be the impression cylinder of printing presses. Cooperating with the pull rolls 17, for example, is a nip providing roll 18 (or a blanket roll) which serves to apply a constraint to the web W. Also provided on the frame 10 for each web is a cocking or skewing roll 19 which serves to eliminate sideward lean.

Alternatively or cumulatively to the pull rolls, constant tension rolls as at 20, 20a and 20b may be provided in the paths of travel of each of the webs W, $W_a$ and $W_b$, respectively.

As the webs leave the last pull roll 17b or the web $W_b$ leaves the last constant tension roll, i.e., dancer roll, 20b, the webs are superposed for processing. For example, in the typical machine, a line hole punching unit 21 is advantageously provided, suitably mounted on the frame 10. To develop the necessary cross perforations, a perforation unit 22 is provided slightly downstream of the line hole punching unit 21. A second cross perforation unit 23 is normally provided so as to develop a second size business form without having to change rolls. For example, in the illustration given, the perforation 22 has a knife roll equipped with three equally spaced apart knives and a circumference of 25½" so as to provide business forms 8½" in length. The perforation unit 23 has a roll circumference of 33"—thereby being able to provide the other popular size of business form which has an 11" length. It will be appreciated that when the perforation unit 22 is being employed, the unit 23 is inoperative—i.e., the cooperating perforating rolls are spaced apart so that the webs pass therebetween without any action being performed on them.

The superposed webs continue on through another processing station 24—see the lower portion of FIG. 1 where file holes can be introduced into the web simultaneously.

The webs are now processed separately in units for controlling the lean in a forward/rearward direction, the unit being designated generally 25b, 25a and 25 proceeding from right to left.

Thus, the first encountered unit 25b handles the bottommost web $W_b$. The second unit 25a handles the web $W_a$ and the most downstream unit 25 handles the web W. After passing through the units 25, 25a and 25b (the detailed structure and function of which will be described hereinafter), the webs are again superposed, passed over an idler 26 and through a series of turning bars 27 so as to separate the webs incident to going into a three wide folder generally designated 28. Thus, each web will generate its own stack. Each web is zig-zag folded as indicated by the letters A and B and are conveyed away from the folder by creeper belts 29 and thereafter to a stack delivery unit 30 at the extreme left hand portion of FIG. 1. The invention also contemplates the processing of side-by-side webs—as well as those which are superposed. For example, the web may be equipped with longitudinally extending lines of weakness (perforations or slits) downstream or upstream of the lean control roll. It is also possible to separate a web stack into two discrete stacks after folding by separation along the longitudinally-extending lines of perforation.

It will be noted that the zig-zag folded web issuing from the folding rolls has adjacent form lengths designated A and B. If the apparatus is operating perfectly, i.e., the distance between adjacent perforation lines is identical, a rectangular shaped stack will be developed such as is illustrated schematically in FIG. 2 where the length of one form A equals the length of the next form B. Two general aberrations or deviations are possible—as illustrated in FIGS. 3 and 4 relative to forward and backward lean, respectively. To correct forward lean, it is necessary to enlarge the form length B which function is performed by the lean control unit 25 relative to the web W. It will be appreciated that with three zig-zag folded continuous web stacks issuing from the machine, various combinations of lean and no lean may occur. Thus, each web requires its own lean control unit.

Reference is now made to the second drawing sheet and, more particularly, to FIG. 5 which is an enlarged view in greater detail of the lean control unit 25 of FIG. 1. The front or left side frame of the machine is again designated 11 and the web W is seen to be proceeding from the right hand side of FIG. 5 around a lean control roll generally designated 31. Thereafter the web proceeds from the roll 31 after a 180° wrap thereon and around the capstan pull roll 32 and a further driven roll 33 and thereafter forms a loop as at W'. A nip is formed between the driven draw roll 33 and a nip roll 34 which—referring to FIG. 6—is a relatively narrow roll as compared to the full width draw roll 33. Thus, the rolls 32-34 form a nip or second constraint which, in combination with the constraint provided by the rolls 17 and 18 place a predetermined tension on the web W. The function of the lean control roll 31 is to cyclically vary this tension or, more particularly, cyclically vary the velocity of the web W as it passes through the perforating means 22 or 23, as the case may be. For this purpose, the lean control roll 31 is interposed between the perforating means 22 or 23 and the downstream constraining means 32-34.

The lean control roll 31 includes a shaft 35 (see FIG. 6) which is journalled in bearings 36 provided in the side frames 11 and 12. Spaced outwardly of the width of the web W, the shaft 35 is equipped with collars 37 which have an eccentric exterior as can be appreciated from the different thicknesses illustrated in FIG. 6 at 38 and 39, respectively. Fixed to each collar 37 is a bearing 40. The outer shell 41 of the lean control roll 31 is mounted on the bearings 40. Thus, the surface of the roll 31 is adapted to rotate freely while the center rotates eccentrically. The eccentricity is exaggerated in the illustration given, the center line of the shaft 35 being designated by the numeral 42 while the center line of the shell 41 of the roll 31 is designated by the numeral 43. In the present practice of the invention, this will be of the order of 0.001" to about 0.004".

To drive the lean control roll shaft 35, it is equipped with a pulley 44 which is connected by means of a cog belt 45 to a second pulley 46 on the output side of a differential drive unit 47. Power to the input side 48 of the unit 47 is derived from the main drive of the apparatus, i.e., the drive which turns the various other driven rolls. The differential drive unit consists of bevel gears interconnected by a spider and planetary gears (see the upper right hand portion of FIG. 6). A suitable device for this purpose is available from The Candy Manufacturing Co. of Chicago, Ill. under the designation "Dynamic Differential DD1A". The differential drive turns the lean control roll shaft 35 at a rate of one revolution for each two forms processed and allows the operator to change the rotary phasing or timing of shaft eccentricity to perforator while the machine is running—in order to control stack lean.

OPERATION

In the operation of the invention, the apparatus is equipped with several parent rolls and the webs, W, $W_a$ and $W_b$ are processed through the apparatus to result in discrete zig-zag folded continuous web stacks in the stack delivery unit 30. In a tended machine, the machine operator views each stack and determines visually whether a forward or rearward lean is present. Alternatively, mechanical or electrical sensing means can be employed for ascertaining the presence of lean. If a lean is present, the setting on the differential speed unit is changed so as to vary the time relationship between the eccentric lean control roll 31 and the perforator 22. More particularly, if a forward lean is present (as exemplified by FIG. 3), the form length A is too long by a matter of a fraction of a thousandth of an inch or so—in contrast to the length of form B. This means that too much of the web has passed through the perforating unit between the lines of perforations defining the form length A and correspondingly, too little between the time successive blades on the perforating roll have engaged the web for defining form length B.

By rotating the eccentric portion (or shaft) of the lean control roll at a speed to make one revolution for each two form lengths and employing the differential speed unit to change the timing between the eccentricity of the roll and the perforator, the position of the lines of perforation can be changed so as to bring about the stack configuration of FIG. 2.

Figure 7:
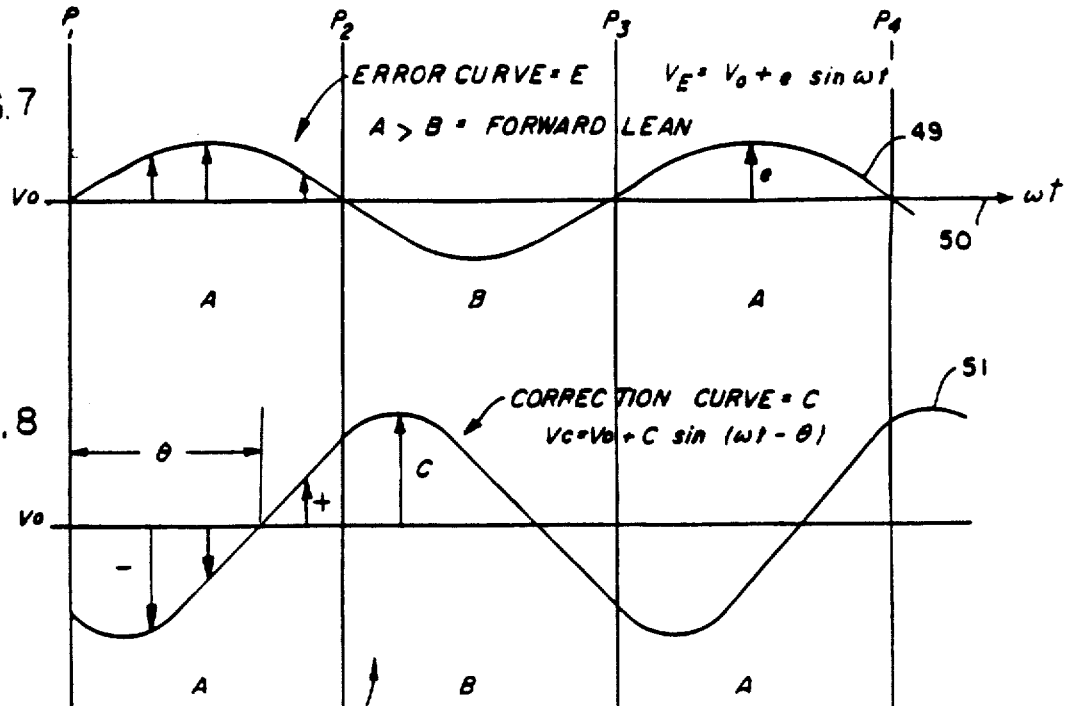
FIGS. 7–10 are graphs showing the operation of the invention.

The foregoing can be better understood by reference to FIG. 7. There the numeral 49 designates a cyclic change of web velocity and the function of time. For ease of illustration and understanding, this is presented as a sine wave. In reality, all of the machine and paper variables can produce a summation quite different than a sine wave—but inasmuch as these are cyclic, the effect of the summation of these variables can be represented by an equivalent sine wave.

The numeral 50 designates the desired web velocity $V_0$, a constant. The designations $P_1$ and $P_2$, etc. refer to the locations of transverse lines of perforation developed by the perforator 22. It will be seen that the area under the curve 49 varies between adjacent lines of perforation. This represents the length of the web passing through the perforator and it is greater between $P_1$ and $P_2$ than it is between $P_2$ and $P_3$. The area is the integral of velocity with respect to time, yielding length. With the illustrated condition, the length between $P_1$ and $P_2$ (A in the illustration given) is greater than between $P_2$ and $P_3$ (B in the illustration given).

Figure 8:
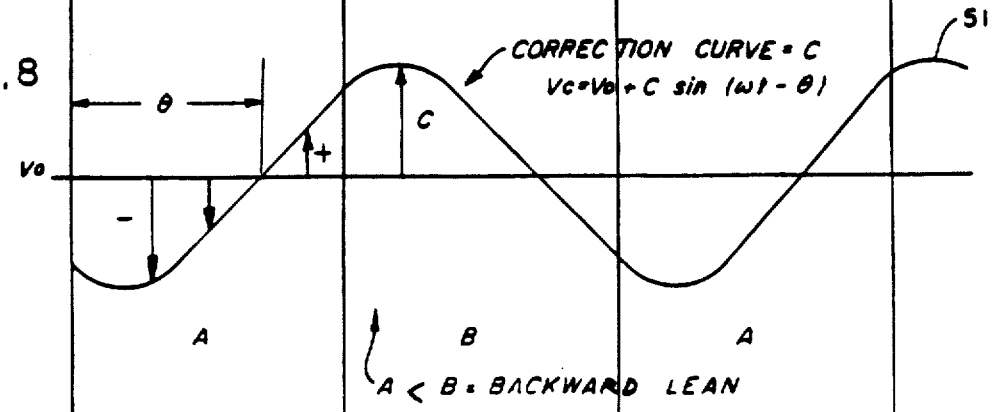

According to the invention, a cyclic motion is introduced into the web having an amplitude variation considerably greater than the amplitude variation of the summation of the machine variables, i.e., the foregoing aberrations represented sinusoidally as at 49. This is illustrated in FIG. 8 where a corrective motion designated 51 is shown. Through the differential drive 47 which permits phase or time shift, the rotational pattern of the lean control roll shaft 35, substantially cancels out the summation of the miniscule aberrations. For example, in FIG. 8, the corrective motion represented by the curve 59 has a smaller area under the curve at A (between adjacent perforation lines $P_1$ and $P_2$) than at B (between perforation lines $P_2$ and $P_3$).

Figure 9:
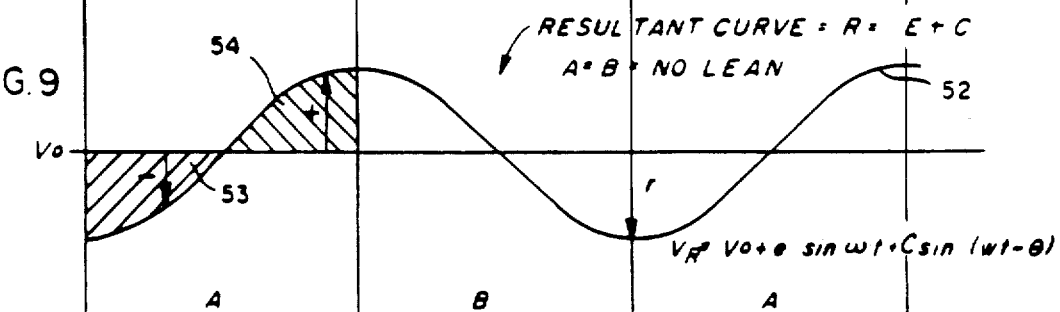

The resultant of the two is represented graphically in FIG. 9 where the areas under the resultant curve 52 between adjacent perforations are the same. Thus, the length of form between adjacent perforations is the same—whatever portion of the curve 52 is below the constant velocity line is the same as that above—compare the cross hatched areas 53 and 54.

Figure 10:
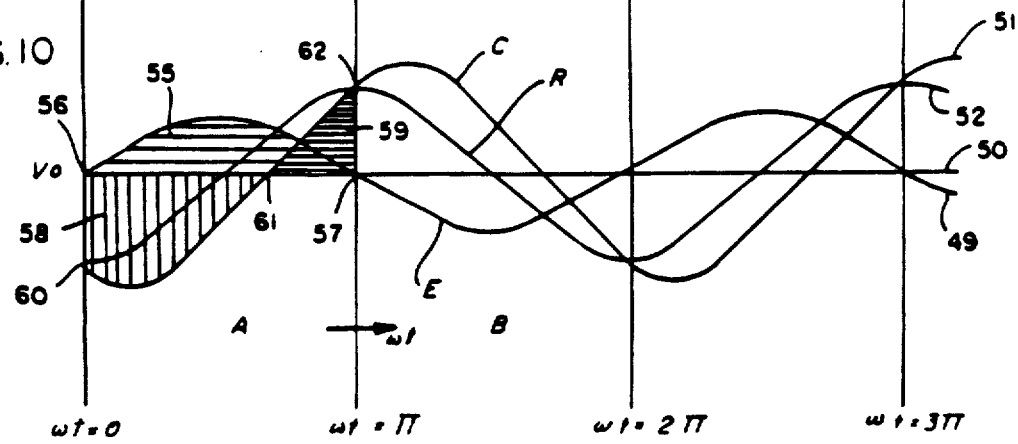

How this is derived is represented graphically in FIG. 10. There, the numeral 55 designates an area under the curve 49 and above the curve 50 which is horizontally hatched and represents the length of the web segment A which is greater than desired, i.e., which creates the forward lean. This extends between the points 56 and 57 which are the intersections of the curved $V_0$ between the perforation line $P_1$ and $P_2$. The corrective curve 51 has a greater amplitude (c being greater than e) and the phasing is different so that what the corrective motion would provide is a length A which is shorter than desired, i.e., the area vertically hatched as at 58 (between points 60 and 61) being greater than the area 59 (horizontally hatched and lying between the points 61 and 62). Through the adjustment of the phase or differential unit 47, the areas 55 and 59 are equal to the area 58. More properly, the areas are those below the respective curves and extending down to the base line but in view of the very small magnitude of the variations in comparison with the total length, the distance between the curves and the base lines has been foreshortened for convenience of depiction.

In the same fashion, the error curve 49 in the portion between the cross perforation lines $P_2$ and $P_3$, falls below the constant velocity line 50. This, without correction, would result in a form length B shorter than that desired. The corrective curve 51 has more area above the constant velocity line 50 than it has below so that the summation will result in a positive correction exactly offsetting the error introduced by the curve 49.

In the operation of the invention as illustrated, the phase shift $\theta$ is achieved through the use of the differential unit 47. In the normal operation of the machine without any correction factor, the error curve will usually assume a position wherein the form length A is different from the form length B. Once the machine is running at a steady state, this small difference in form length will manifest itself upon accumulation of error in a lean either forward or rearward. By the same token, the corrective curve resulting from the operation of the lean control roll 31 will normally not be such as to exactly compensate for the length error. The only action required for correction of stack lean is that the machine operator starts the motor 63 (see the upper right hand portion of FIG. 6) so as to activate the ring gear 64 which in turn moves the spider gearing 65 in a planetary fashion and thus changes the connection between the bevel gears 66 and 67 connected to the input and output 48 and 46, respectively. Once the stack is balanced, the motor 63 is stopped and a constant state operation is achieved wherein the phasing of the eccentric roll 31 is exactly compensatory (for all practical intents and purposes) to the error accumulation due to machine and paper variables.

It will be appreciated that the invention is quite versatile, particularly where different form lengths are desired, i.e., 8½" versus 11". By having the surface of the lean control roll 31 operate as an idler but eccentrically moving the center during a different time period (by changing the drive ratio) the machine operation can be changed from one form length to another without the need for changing the lean control roll 31.

Alternative to the phase shifting provided by the eccentric lean control roll 31, amplitude shifting can be utilized to advantage in the practice of the invention—as by cyclically moving the roll 31 so as to increase or decrease the length of the draw between the perforating means and the downstream constraint. In any event, a transverse force is applied to the web W to change its motion past the perforating means. Where two constraints are employed, this results in a change in the tension in the web to compensate for the various aberrations built up upstream. However, where a constant tension roll is employed as at 20, the tension remains constant but the motion still changes because of the imposition of the cyclic transverse force.

The invention also permits compensation for cyclic motion deviations other than those occurring over two form lengths. If a second aberration such as the 66 cycle variation mentioned above is to be compensated for, a compound input to roll shaft 35 can be employed with the output being the sum of the two cyclic inputs. Structurally, this is achieved by adding a phasing unit to provide a twice modified correction curve.

The invention is preferably practiced where the web tension is controlled by pull rolls although conventional pin belts can also be employed. In such a case, there might be the tendency to enlarge the holes rather than increase the web velocity past the perforating unit.

While in the foregoing specification a detailed description of the invention has been set down for the purpose of illustration, many variations in the details hereingiven may be made by those skilled in the art without departing from the spirit and scope of the invention.

We claim:

1. In a method for correcting stack lean in a zig-zag folded continuous web having selected longitudinally spaced lines of transverse perforation and a fold at each said selected line, the steps of feeding a web through a means for transversely perforating the web while the web is under tension, and applying a cyclically varying additional force to the web for the purpose of changing the longitudinal length between said selected lines as the web passes through the perforating means, *by producing an amount of motion in said web passing through the said perforating means greater than variables which cause a leaning stack,* the duration of [said] *the* cycle of said *cyclically varying additional* force extending at least over the *travel of* web length between three folds *said cyclically varying force being a substantially continuously acting sinusoidal force and adjusting the cyclically applied force to cancel the amount of cyclic motion from the machine and paper variables, the adjustment of said cyclically applied force being achieved by adjusting the phase relationship between said cyclically applied force and said cyclic motion resulting from the machine and paper variables.*

2. The method of claim 1 in which a plurality of superposed webs are advanced through the perforating means, and independently cyclically applying a force to each web for the purpose of changing the distance between selected perforations as the web passes through the perforating means.

3. The method of claim 1 in which a plurality of side-by-side webs are advanced through the perforating means, and independently cyclically applying a force to each web for the purpose of changing the distance between selected perforations as the webs pass through the perforating means.

4. The method of claim 1 wherein a web constraining means is applied before the web perforating means and a second web constraining means is applied after the web perforating means.

5. The method of claim 4 in which a force is cyclically applied perpendicular to said web between the perforating means and one of said constraining means.

6. The method of claim 4 in which one constraining means includes pulling the web downstream of said perforating means so as to develop a predetermined tension therein, said force being operable to cyclically change the tension in said web.

7. The method of claim 4 in which one constraining means includes pulling the web downstream of said perforating means, said force being operable to change the length of the path between said one constraining means and said perforating means.

8. In a method for correcting stack lean in a zig-zag folded continuous web having longitudinally spaced lines of perforation, the steps of transversely perforating said web by advancing same through a perforating means, constraining and advancing said web at two longitudinally spaced points on opposite sides of the means for perforating the web, applying a [cyclically] *substantially continuously acting sinusoidally* varying force perpendicular to the plane of said web to change the longitudinal length between the lines of perforation by producing an amount of motion in said web passing through the said perforating means greater than the cyclic motion resulting from the machine and paper variables which cause a leaning stack, *the duration of a sine cycle of said force extending at least over the web length between three folds,* and adjusting the [cyclically] *sinusoidally* applied force to cancel the amount of cyclic motion from the machine and paper variables *while said web is being advanced, the adjustment of said sinusoidally varying force being achieved by adjusting the phase relationship between said sinusoidally varying force and said cyclic motion resulting from the machine and paper variables.*

[9. The method of claim 8 in which said transverse force cyclic application is sinusoidal.]

10. The method of claim 8 wherein said web is equipped with longitudinally extending lines of weakness.

11. The method of claim 10 in which said longitudinally extending line of weakness is either a slit or a longitudinal perforation and occurs after one of said constraining points.

12. The method of claim 11 wherein said web is longitudinally perforated and the resultant web separated into discrete webs after folding.

[13. The method of claim 8 in which the adjustment of said cyclically applied force is achieved by adjusting the time relationship between said cyclically applied force and said cyclic motion resulting from the machine and paper variables.]

14. Apparatus for correcting stack lean in zig-zag folded webs comprising means for advancing a web under tension along a predetermined path, a perforator operably associated with said path for transversely perforating said web on approximately equally longitudinally spaced apart lines, and further means operably associated with said path for applying a [cyclically] *substantially continuously acting sinusoidally* varying additional force to said web to cyclically and incrementally change the distance between where preselected perforations will be made before said web is engaged by said perforator, *said additional force producing an amplitude of motion greater than the amplitude of the cyclic motion resulting from the machine and paper variables which cause a leaning stack, said additional force having a sine cycle whose duration extends at least over the web length between three folds, said further means including speed differential means for adjusting the phase relationship between said additional force and said cyclic motion to cancel said cyclic motion.*

[15. The apparatus of claim 14 in which said further means includes a roll for increasing the tension in said web.]

[16. The apparatus of claim 14 in which said further means includes roll means for changing the web velocity by shifting the web longitudinally.]

*17. Apparatus for correcting stack lean in a zig-zag folded web comprising a frame, means on said frame defining a web path and web constraining means spaced apart in said path,*

*a perforator in said path between said constraining means for perforating said web on approximately equally longitudinally spaced lines,*

*an eccentric roll rotatably mounted on said frame between said web constraining means, and*

*means operably associated with said frame for rotating said eccentric roll to provide a substantially continuously acting sinusoidally varying force on said web*

*having a sine cycle whose duration extends at least over the web length between three folds, said sinusoidally varying force producing an amplitude of motion greater than the amplitude of the cyclic motion resulting from the machine and paper variables which cause a leaning stack, and speed varying means operably associated with said rotating means for changing the phase of said sinusoidally varying force relative to the lines of perforation to cancel said cyclic motion.*

*18. The apparatus of claim 17 in which said speed varying means includes a differential drive unit interposed in said rotating means.*

*19. Apparatus for correcting stack lean in a zig-zag folded web comprising a frame, means on said frame defining a web path and web constraining means spaced apart in said path,*

*a perforator in said path between said constraining means for perforating said web on approximately equally longitudinally spaced lines to provide a form length between adjacent lines of perforation,*

*an eccentric roll rotatably mounted on said frame between said web constraining means, said frame providing means to partially wrap said web about said eccentric roll to provide constant web contact therewith,*

*means operably associated with said frame for continuously rotating said eccentric roll to provide a substantially continuously acting sinusoidally varying force on said web having a sine cycle whose duration extends over an even number of form lengths, said sinusoidally varying force producing an amplitude of motion greater than the amplitude of the cyclic motion resulting from the machine and paper variables which cause a leaning stack, and differential means operably associated with said rotating means for changing the phase of said sinusoidally varying force relative to the lines of perforation to cancel said cyclic motion.*

* * * * *